United States Patent [19]
Sinz et al.

[11] 3,791,224
[45] Feb. 12, 1974

[54] APPARATUS FOR MOUNTING THE MAGNET SHAFT OF A SPEEDOMETER

[75] Inventors: Karl Sinz, Ditzingen; Karl Nirenberg, Neuhausen; Hans Repphun, Kirchheim, all of Germany

[73] Assignee: Moto Meter GmbH, Leonberg/Wurtt., Germany

[22] Filed: Oct. 2, 1972

[21] Appl. No.: 294,099

[30] Foreign Application Priority Data
Oct. 1, 1971 Germany............ P 21 49 146.3

[52] U.S. Cl. ............................................. 73/519
[51] Int. Cl. ................... G01p 1/04, G01p 3/49
[58] Field of Search .......................... 73/519, 520

[56] References Cited
UNITED STATES PATENTS
3,517,561  6/1970  Holbrook .................... 73/519
3,111,037  11/1963  Wallis ......................... 73/519

*Primary Examiner*—James J. Gill
*Attorney, Agent, or Firm*—George H. Spencer

[57] ABSTRACT

In a measuring device such as a speedometer, the magnet shaft with an attached magnet is rotatably mounted within a cylindrical plastic bushing mounted in the speedometer body in order to secure the shaft against any radial movement. A plastic holding disc is attached to the magnet shaft and then secured within the speedometer body so as to prohibit any axial displacement of the shaft.

13 Claims, 6 Drawing Figures

PATENTED FEB 12 1974

3,791,224

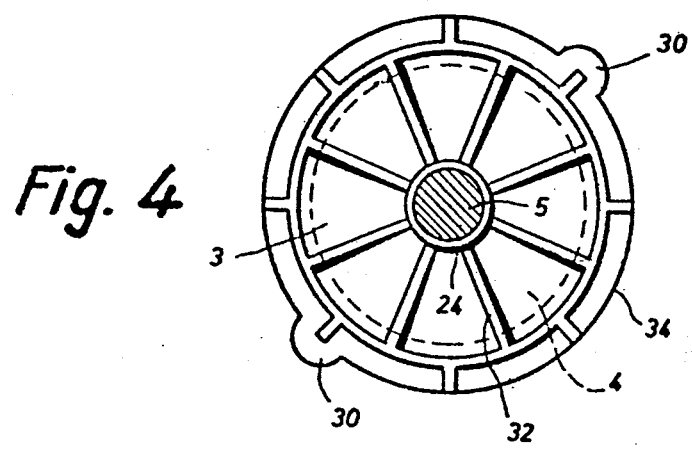
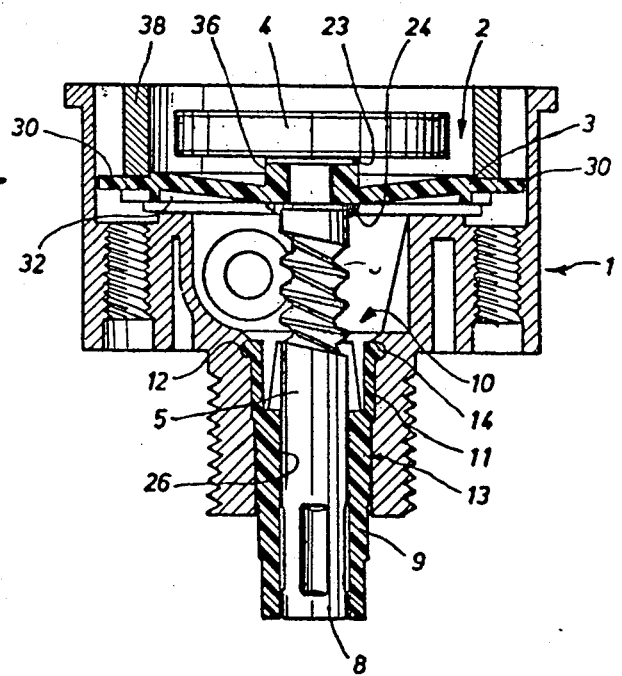

APPARATUS FOR MOUNTING THE MAGNET SHAFT OF A SPEEDOMETER

BACKGROUND OF THE INVENTION

The magnet shaft which is mounted in a speedometer is the section of the shaft which rearwardly extends from the front portion of the speedometer body and is connected at one end with a disc-shaped magnet. The other end of the magnet shaft is connected with the square end of the drive shaft which is usually formed by a flexible cable, thus providing the measuring apparatus with a rotation which is proportional to the speed in the case of speedometers or a rotation which is proportional to the number of revolutions of the engine in the case of tachometers. Rotation of the magnet shaft and the magnet by the drive shaft induces eddy currents in an aluminum drum which extends over the magnet and to which the indicating needle is connected, thus displacing the indicating needle so as to provide an indication.

It is known in the prior art that the magnet shaft can be mounted in a metal speedometer body by a zinc bearing which has an elongate shape or by a so-called sinter metal bearing. A grease chamber is provided between the bearing points in the speedometer body and is filled with grease or some other permanent lubricant for providing lubrication for the bearing points.

It has been found that these types of bearings can no longer meet the increased demands being placed upon them, particularly since the newer devices are operated over increased temperature ranges at a relatively high humidity.

SUMMARY OF THE INVENTION

An object of the present invention is to provide a device for mounting the magnet shaft of a speedometer, tachometer or similar instrument which can meet these new operating conditions and which shows very little wear over extremely long periods of use.

In order to solve this problem the present invention replaces the bearing of the prior art devices, such as the type described above, with a cylindrical bushing made of a hard plastic material, such as an acetal copolymer and which forms a radial bearing for the magnet shaft, which is located within a bore in the speedometer body, and a holding disc of the same plastic material which is arranged in a further bore in the speedometer body and which forms an axial bearing thus providing bearings in both the axial and the radial direction.

According to a further feature of the invention, the portion of the plastic bushing facing the magnet is provided with tongues or protrusions which are distributed over its periphery and which engage into an inner annular recess which is formed in the speedometer body. The plastic bushing is further fastened to the speedometer body in a press fit. The plastic bushing therefore is secured in the speedometer body so as to prevent any displacement, either axial or radial.

The holding disc encloses the magnet shaft at a tapered portion in such a manner that displacement in the axial direction of the shaft becomes impossible.

BRIEF DESCRIPTION OF THE DRAWINGS

FIG. 2b is a top view of FIG. 2a.

FIG. 4 is a view of the plastic holding disc from below taken along line 4—4 of FIG. 3, and FIG. 5 shows a sectional view of the speedometer body having the magnetic section of FIG. 3 inserted therein.

DESCRIPTION OF THE PREFERRED EMBODIMENTS

Figure 1:
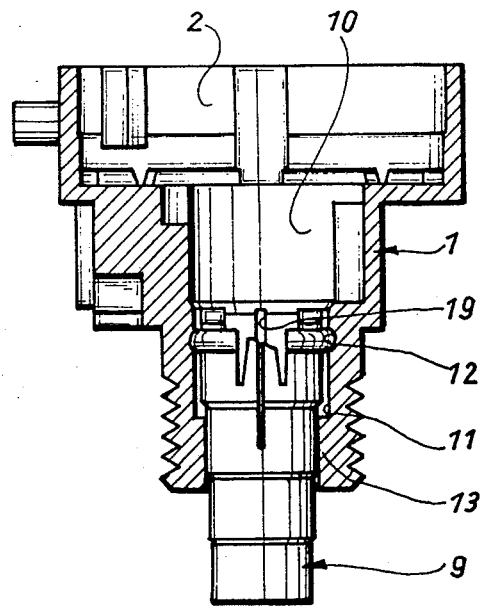
FIG. 1 illustrates the speedometer body with the plastic bushing according to the invention mounted therein.
Figure 3:
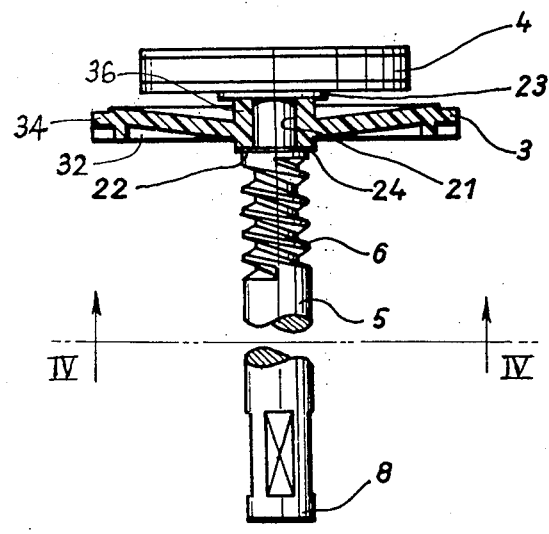
FIG. 3 illustrates the magnetic section of the speedometer according to the invention including the magnet shaft of the speedometer with the magnet and the plastic holding disc according to the invention attached thereto.

The speedometer body 1, as shown in FIG. 1, is provided with an upper bore or chamber 2 in which is disposed the magnet 4 which is shown in FIG. 3 and which serves to provide the rotational indication for the speedometer. As further shown in FIG. 3, the magnet 4 together with a plastic bearing or holding disc 3, which will be described further below, are mounted on one end of the magnet shaft 5 which has a worm gear 6 which for example could drive a kilometer counter. The other components which are present in a speedometer, tachometer or similar instrument which are arranged above the speedometer body 1 and which are connected therewith need not be discussed in detail below because they are well known in the prior art and are not required for an understanding of the present invention.

The speedometer body 1 is provided with a further bore 11, which is below the bore or cavity 2, in which is mounted a cylindrical plastic bushing 9 which serves as a radial bearing for the magnet shaft 5. The magnet shaft 5 is inserted from the top into the speedometer body of FIG. 1 in such a manner that the end portion 8 of the magnet shaft 5 is substantially flush with the lower portion of the plastic bushing 9 and with the lower surface of the disc 3 bearing against the lower surface of the body 1 within the bore or cavity 2. It can easily be seen that in this manner the magnet shaft 5 is completely mounted within the plastic bushing and is supported against any influence of radially and axially acting forces.

The speedometer body 1 is provided with an open area or enlarged bore 10 which is disposed approximately at the height of the worm gear 6 of the magnet shaft 5 and only serves to provide an area in which other elements can be operatively connected with the worm gear. The actual receptacle or bore 11 in the speedometer body 1, for the insertion of the plastic bushing 9, is disposed below the open space 10. This receptacle or bore 11 is provided with an annular inner recess 12 at a distance spaced below the end of the open space 10. Tongues or protrusions 14 are provided on the outer surface of the plastic bearing bushing 9 and are arranged so as to engage this recess 12. These tongues or protrusions 14 will be described in detail below. The lower region 13 of the bore 11 of the speedometer body 1 is so dimensioned that the plastic bushing 9 is here held in place by a press fit.

Figure 2A:
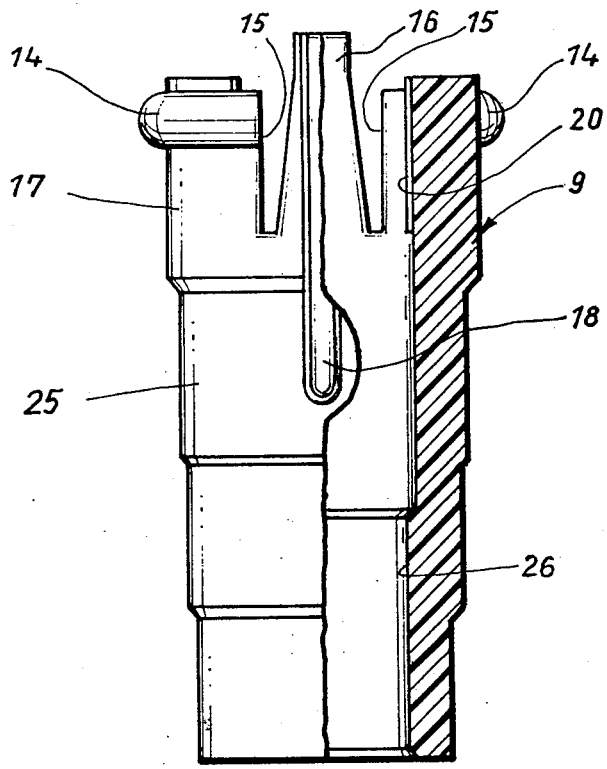
FIG. 2a is an enlarged side view partially in section of the plastic bearing bushing of FIG. 1.

The plastic bushing 9 is shown in detail in FIG. 2a. The bushing comprises a cylindrically designed hollow body of a tough plastic material preferably of a polyacetal or an acetal copolymer, for example copolymers of formaldehyde, available under the designation "Delrin" from Dupont Corporation. The shaft 5 passes through the bushing 9 so that it is able to rotate but without any radial displacement. The bushing 9 which is connected in a press fit with the speedometer body mentioned above is provided with resilient annular protrusions 14 located around its periphery. These protrusions 14 engage the speedometer body so as to provide firm anchoring with the speedometer body in the axial direction.

In the embodiment shown, the upper region of the plastic bushing 9 is provided with eight downwardly extending cuts or recesses 15 which are so designed that groups of four upwardly extending rod-shaped extensions 16 are formed which are tapered in the shape of a pyramid and which with their upper portions protrude beyond the remainder of the elements of the bushing. The remaining portions 17, which will be referred to as holding elements, are disposed between the rod-shaped extensions 16 and have a uniform cross section. In the upper portions of holding elements 17, the outwardly directed annular collar or protrusions 14 mentioned above are attached.

Figure 2B:
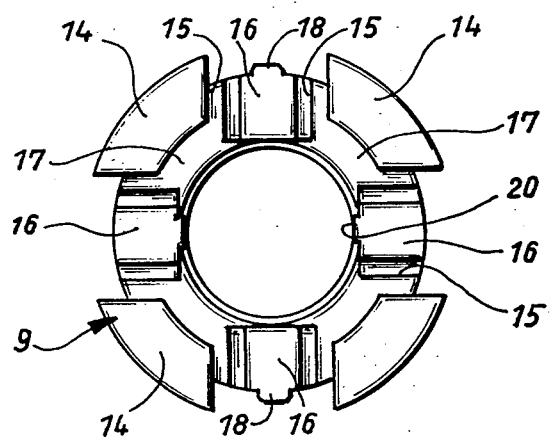

As can be seen from FIG. 2b the rod-shaped extensions 16 are inwardly offset in the direction toward the shaft axis with respect to the holding elements 17. The reason for this is as follows: If the cylindrical hollow bushing 9 is inserted from the top into the speedometer body of FIG. 1, then the holding elements 17 with their tongue-shaped protrusions 14 are located behind the inner annular recess 12 in the speedometer body. In order for the holding elements 17 to be able to freely move, the pressing tool used to firmly seat the bushing 9, in the bore portion 13 does not engage the bushing 9 at these holding elements, which furthermore would be unfavorable because these holding elements, as shown in FIG. 2b, are spaced far apart radially and do not offer any substantial surface for contact with a pressing tool. The tool, therefore, presses onto the upper portions of the rod-shaped extension 16 until the protrusions 14 snap into recess 12. Actually this requires a relatively strong pressure since at the same time a press fit must also be achieved between the lower region 13 of the bore 11 of the speedometer body and the bushing 9 in the shaped central region 25 of the bushing 9. The region 25 has a larger internal diameter than the lower portion 26 of the bushing 9 and accordingly no bearing point for the magnet shaft 5 is provided in this shaped region 25.

In addition, bars 18 are provided extending along the outer surface of the rod-shaped extensions 16 and far beyond them towards the lower end of the bushing. These bars 18 engage in correspondingly shaped recesses 19 formed in the inner surface of the speedometer body within the bore 11, when the bushing 9 is placed in the bore 11 so that the bearing bushing 9 is secured against rotation. In the embodiment shown in FIG. 2b only two bars 18 have been shown for the purpose of convenience but in general a total of four diametrically disposed bars are provided so that during installation no angle of rotation larger than 45° need be traversed in order to locate the bars 18 within the corresponding groove-shaped recesses 19 in the speedometer body.

In order to understand a further important feature in the structure of the plastic bearing bushing 9, the following must first be discussed. During long periods of use, the play of the torsion stressed drive shaft and the other transmission parts, which play is expressed in angular degrees, increases with the final result being that during irregular driving conditions, bad roads or at strongly fluctuating speeds the speedometer indicator will begin to vibrate and flutter because no regular rotational speed can act on the magnet 4 due to the torsional play in the drive shaft. In order to prevent such fluttering of the speedometer needle or other indicator needles due to increasing play, the plastic bearing bushing 9 is provided with inwardly directed ribs 20, which are located on the inner surface of the rod-shaped extensions 16 for example. These ribs 20 extend into the path of magnet shaft 5. Since the ribs 20 are provided on the rod-shaped extension 16 they are resilient and act as a slight continuous adjustable braking moment on the magnet shaft in such a manner as to smoothly control the movement of the magnet shaft.

Due to the resiliency and the high resistance of the plastic employed there will be very little wearing so that the set valves are maintained relatively stable over the entire duration of operation of the associated instrument.

In order for the magnet shaft to also be secured against axial displacement, a plastic bearing disc 3 extends around the upper portion of the shaft 5 which has a reduced diameter 21 in this area for receiving the disc. Consequently, while the magnet shaft 5 can rotate within this disc 3, the disc acts as an axial bearing so that the magnet shaft is supported in an axial direction. The magnet 4 is attached to the upper stump of the shaft 5 which passes through the plastic disc 3. An intermediary washer or journal bearing ring 23 is located on the shaft 5 between the disc 3 and the magnet 4. At the lower bearing point an intermediary disc 24 of a suitable material, e.g. metal, may also be provided between the frontal portion of the plastic bearing disc 3 and widened portion 22 of the shaft 5. The two rings 23 and 24 support the disc 3 on the magnet shaft 5 and prevent relative axial displacement therebetween.

The plastic disc 3 is fixedly mounted in the upper portion 2 of the speedometer body 1 and is thus secured against both axial and rotational displacement and consequently the magnet shaft 5 and the attached magnet 4 are secured against axial displacement. To prevent the disc 3 from rotating, the disc is provided with tongues 30 over its periphery which engage in corresponding recesses of the speedometer body 1. The plastic disc 3 is secured against upward axial displacement by elements which engage the disc 3 at its outer edge and clamp it tightly in place within the speedometer body 1. These elements may be a retaining ring 38, which simultaneously may represent a magnetic return path for the magnet 4. The arrangement of the retaining ring 38 can be seen from FIG. 5, whereby the retaining ring 38 may be inserted into the upper bore 2 and connected thereto in a press fit, if needed.

On the other hand, when the assembled components as shown in FIG. 5, are connected with the remaining parts, e.g. the indicator section (not shown in the drawings) this may be effected by screwing the indicator section onto the speedometer body thereby clamping the retaining ring 38 and exerting a continuous downward pressure on this ring 38 and on the plastic disc 3, and firmly clamping these components together.

The configuration of the plastic disc 3 is designed so that ribs 32 extend over the periphery from an outer wheel edge 34 toward the hub 36. These ribs 32 are downwardly directed at an oblique angle so that a special force is exerted in the direction toward the drive shaft. The square end of the drive shaft is inserted at the lower end 8 of the shaft 5 where it is secured by a cap screw. Thus there is produced an axial bias for the magnet shaft in an upward direction which is counteracted by the design of plastic bearing disc 3 which is formed from any suitable appropriately hard plastic for example, a polyacetal or an acetal copolymer as already mentioned. The assembled components are shown in FIG. 5, whereby the magnetic section comprising the magnet 4 and the plastic disc 3 are inserted from the top into the speedometer body.

The plastic disc 3 is securely fixed against rotating by the tongues 30 engaging corresponding recesses of the speedometer body 1.

In the embodiment of the invention two tongues are provided, but more or less tongues may be used by one skilled in the art, if necessary. The shaft 5 carrying the magnet 4 is freely rotatable in the lower bearing bushing 9 and fixed against any axial displacement by the plastic disc 3. This plastic disc 3 is secured against axial displacement by the retaining ring 38 as already mentioned, which may be inserted in a press fit in the upper part of the speedometer body 1. When assembling the whole instrument, this retaining ring 38 is abutted by further components (not shown), for example the indicator section and is then additionally clamped by a continuous downward pressure.

It will be understood that the above description of the present invention is susceptible to various modifications, changes and adaptations, and the same are intended to be comprehended within the meaning and range of equivalents of the appended claims.

We claim:

1. In a speedometer having a speedometer body and a magnet mounted on one end of a shaft located within the speedometer body, apparatus for rotatably mounting the shaft within the speedometer body comprising: a cylindrical bushing of a hard plastic material attached to said speedometer body within a first bore in said speedometer body, said shaft having its free end extending through said bushing at least a portion of which is dimensioned to form a radial bearing for said shaft, a holding disc of said hard plastic material mounted on said shaft between said magnet and said bushing, said disc being attached to the speedometer body within a second bore in said speedometer body, which is axially aligned with said first bore, and forming an axial bearing for said shaft and the end of said bushing facing said disc being provided with a plurality of rod-shaped extensions and resilient holding elements formed by recesses extending axially along said bushing.

2. Apparatus as defined in claim 1 further comprising annular protrusions located on the outer surface of said holding elements, an annular recess located in the inner surface of said first bore and engaging said annular protrusions so that said bushing is secured against axial displacement.

3. Apparatus as defined in claim 1 wherein said rod-shaped extensions and said holding elements are uniformly and alternately distributed over the periphery of said end of said bushing and said rod-shaped extensions extend beyond the end surface of said holding elements and are inwardly directed towards the axis of said bushing so that they provide a surface for contact with a pressing tool.

4. Apparatus as defined in claim 1 further comprising a protrusion extending axially along the outer surface of at least one of said rod-shaped extensions and a mating axial groove formed in the inner surface of said first bore of said speedometer body engaging said axial protrusion to secure said bushing against rotation.

5. Apparatus as defined in claim 1 wherein the inner diameter of said bushing in the portion thereof containing said rod-shaped extensions is larger than the inner diameter in the portion thereof forming said radial bearing; and wherein said bushing further includes means for acting as a brake on said shaft to control the motion of said shaft, said means including protrusions extending along the inner surface of said rod-shaped extensions facing the axis of said bushing and contacting said shaft.

6. Apparatus as defined in claim 1 wherein said plastic material is an acetal or a polyaceatal copolymer.

7. Apparatus as defined in claim 1 wherein as least a portion of said bushing forms a press fit with said speedometer body within said first bore.

8. Apparatus as defined in claim 8 wherein said portion of said bushing which forms a press fit with said speedometer body is outside of the area of said bushing which forms said radial bearing for said shaft.

9. Apparatus as defined in claim 1 wherein said shaft has a portion with a smaller diameter than the diameter of the remaining portion of said shaft and wherein said holding disc is mounted on said smaller portion of said shaft so that said shaft can rotate independent of said disc.

10. Apparatus as defined in claim 9 wherein said disc has a widened hub portion; and further comprising an intermediary bearing ring mounted on said shaft adjacent the surface of said disc which faces said bushing, for supporting said disc on said shaft.

11. Apparatus as defined in claim 9 wherein a stump portion of said shaft extends through said disc and said magnet is attached to said stump portion; and further comprising a bearing ring mounted on said shaft between said magnet and said disc.

12. Apparatus as defined in claim 9 wherein said holding disc includes a plurality of ribs extending from an outer peripheral surface of the disc towards a central hub portion in an oblique direction toward said bushing so as to absorb the axial pressure of said shaft.

13. Apparatus as defined in claim 1 further comprising tongue elements provided on an outer periphery of said holding disc, and recesses provided within said speedometer body engaging said tongue elements to secure said holding disc against rotational movement.

* * * * *